INVENTOR.
WILLIAM S. ELLIOTT
BY Moody and Goldman
ATTORNEYS

June 14, 1960 W. S. ELLIOTT 2,941,167

STABILIZED ELECTRONIC TUNING MEANS

Filed July 16. 1956 2 Sheets-Sheet 2

*INVENTOR.*
WILLIAM S. ELLIOTT
BY Moody and Goldman
ATTORNEYS 2,941,167

STABILIZED ELECTRONIC TUNING MEANS

William S. Elliott, Cedar Rapids, Iowa, assignor to Collins Radio Company, Cedar Rapids, Iowa, a corporation of Iowa Filed July 16, 1956, Ser. No. 597,914

4 Claims. (Cl. 333—17)

This invention relates generally to a system for automatically tuning and stabilizing electronically-tunable circuits.

The tuned circuit of this invention uses an electronically-variable inductor as its tuning element. Such inductors are well known; and, for example, one type is described in Patent No. 2,708,219 to L. M. Carver; and another type is described in Patent No. 2,302,893 to W. V. B. Roberts.

Electronically-variable inductors have at least a control winding and a controlled winding on the same core. The control winding receives a control current that determines the degree of saturation of the core; wherein the inductance of the controlled winding varies with the degree of core saturation. Generally, the controlled winding is wound in a manner that prevents A.C. coupling between it and the control winding.

Exceedingly large inductance variations can be obtained with electronically-variable inductors compared to mechanically-varied inductors. Accordingly, many types of electronically-variable inductors are capable of tuning a resonant circuit over a large-frequency range.

Furthermore, several resonant circuits having such inductors can have their control windings connected in series to be controlled by a single source of control current. In this case, the resonant circuits may track together frequency-wise. Such tracking-resonant circuits may operate as a unit, as in a filter, or in different units, as in a tunable amplifier and tunable oscillator.

This invention provides and regulates the control current for a single tunable circuit or a plurality of tunable circuits that may track together.

Electronically-tunable inductors generally do not have as much stability as mechanically-tunable inductances, primarily because of temperature variation.

Therefore, if such electronically-tunable circuits are initially tuned to a given frequency by a constant-current source, which can be maintained precisely at its initially set value of current, the tuned frequency of the circuit will vary with temperature and will therefore be unstable.

This invention provides means for tuning and stabilizing the resonant frequency of an electronically-tuned circuit with respect to a given source of frequency.

The invention provides means for adjusting the control current of an electronically-tuned circuit in a manner that maintains it aligned with the given-source frequency, regardless of temperature variation.

The invention includes an electronically-tunable circuit of the same type that is used in tunable circuits controlled by the invention; wherein all of such circuits have substantially the same control-current response.

The invention has a self-correcting circuit including a direct-current feedback loop, wherein the feedback current is automatically adjusted.

A frequency, to which the system is to be tuned, is passed through the tunable circuit and is amplified and detected. The detected current is provided through the control winding of the electronically-variable inductance that controls the tunable circuit. The detected current is, in a sense, direct-current feedback; and it also is the control current provided at the output of the invention for regulating other electronically-variable inductors that must be tuned with respect to the given source frequency.

Further objects, features and advantages of this invention will be apparent to a person skilled in the art upon further study of the specification and drawings, in which.

Figure 3:
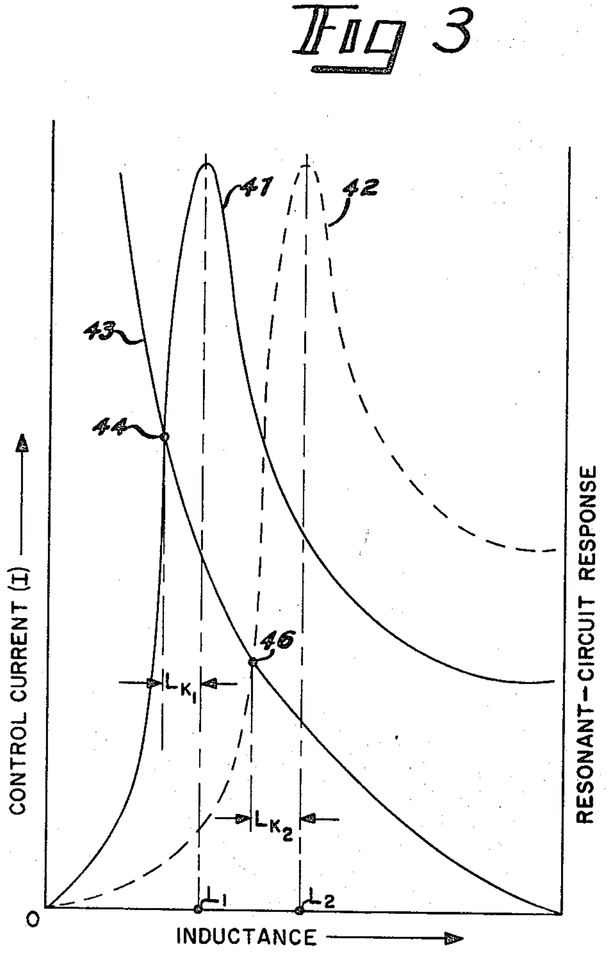

Figure 3 provides a diagram used in explaining the operation of the invention.

Figure 1:
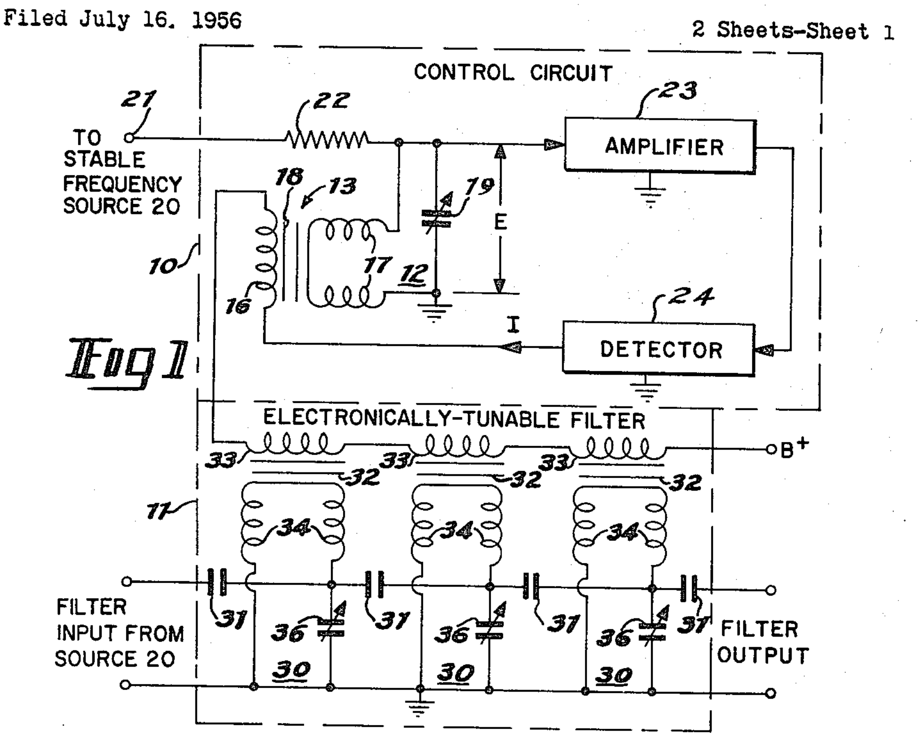
Figure 1 illustrates one form of the invention.

Now referring to the invention in more detail, Figure 1 provides a form of the invention shown as control circuit 10. For illustration purposes in Figure 1, the circuit 10 controls the tuning of an electronically-tunable filter 11.

Control circuit 10 includes a tunable circuit 12 that is regulated by an electronically-tunable inductor 13. It has a control winding 16 and a series-connected dual inductance winding 17, wound on the same core 18. A capacitor 19 is connected across dual-inductance winding 17 and has one end connected to ground. Thus, inductance winding 17 and capacitor 19 provide parallel-resonant circuit 12.

A terminal 21 is connected to a stable-freqency source 20, which for example, may or may not be a crystal-controlled source.

A resistor 22 is connected between terminal 21 and tunable-circuit 12. Resistor 22 accentuates the frequency response of circuit 12 when it is tuned through the frequency provided at terminal 21. This results because resistor 22 and circuit 12 provide, in effect, a voltage divider. Hence, when circuit 12 is tuned away from the incoming frequency, it provides a low impedance; and resistor 22 will absorb most of the voltage provided between terminal 21 and ground. On the other hand, when resonant circuit 12 is tuned to the frequency provided at terminal 21, circuit 12 has a high impedance and absorbs most of the voltage between terminal 21 and ground. Accordingly, variation of voltage E, provided across circuit 12, will have a sharper frequency response due to resistor 22.

An alternating-current amplifier 23 has its input connected across resonant circuit 12 to receive voltage E. A detector 24 is connected across the output of amplifier 23. Accordingly, detector 24 will provide an output current I, which will be used as the control current for the system.

Control winding 16 of inductor 13 serially receives control current I, and the inductance of winding 17 varies accordingly. Consequently, the tuned frequency of circuit 12 is controlled by detected current I.

In Figure 1, detector 24 follows amplifier 23, and therefore amplifier 23 may be an A.C. amplifier. If the detector 24 is connected between the output of resonant circuit 12 and the input to amplifier 23, then amplifier 23 must be a D.C. amplifier. It will generally be preferable to use the arrangement shown in Figure 1 because of the greater stability provided by A.C. amplification. However, when the frequency at terminal 21 is extremely high, initial detection may be preferred.

The invention can control a single tunable circuit or a plurality of tunable circuits having independent functions but tracking together.

Electronically-tunable filter 11 is arbitrarily shown to have three stages of resonant circuits 30 connected in tandem by coupling capacitors 31.

Each filter stage 30 includes an electronically-variable dual inductor 34, which is wound on the same core 32 as its control winding 33. Inductors 34 are of the same type as inductor 17 and use the same type of control windings. Each resonant circuit 30 has an adjustable capacitor 36 connected across its inductance 34. Thus, circuits 30 may be tuned to the same frequency; or on the other hand, they may be stagger-tuned according to the requirements of the particular filter.

The operation of the control circuit in Figure 1 may be explained with the use of the curves shown in Figure 3. Curve 41 illustrates the response of tuned circuit 12 to a given input frequency $f_1$, as the inductance of its winding 17 is varied.

Similarly, curve 42 (in dashed lines) illustrates the response of circuit 12 at another fixed-input frequency $f_2$, as the inductance of its winding 17 is varied.

On the other hand, curve 43 illustrates the variation of inductance 17 as the current through its control winding 16 is varied. Hence, as the control current through winding 16 is increased from zero, the inductance of winding 17 is decreased.

The resonant-circuit response illustrated by curves 41 and 42 is taken at the current output of detector 24, and therefore is a function of the gain of amplifier 23 and any attenuation by detector 24.

It is desirable that amplifier 23 and detector 24 be stable, since the amplitude of curves 41 and 42 in Figure 3 would have their amplitudes varied by such instability.

However, in the circuit of Figure 1, the current from detector 24 is the current provided to control winding 16. Accordingly, they have the same current value, which is shown in Figure 3 by the point of intersection 44 of the curves 41 and 43, although the given-input frequency would require an inductance $L_1$ to resonate the circuit 12. Thus, point 44 represents the stable condition for the operation of control circuit 10.

However, during the stable operation of circuit 10 at point 44, circuit 12 will not be tuned to resonance but will be tuned to a frequency, which differs from the resonant frequency by the amount of inductance $L_{k_1}$ which is the inductance between point 44 and the resonant inductance $L_1$.

Consequently, circuit 12 is tuned to a frequency which is somewhat higher than the incoming frequency $f_1$ provided at terminal 21. However, the tuned frequency of circuit 12 will have a substantially fixed relationship to the incoming frequency; and at this frequency, control circuit 10 will provide the amount of control-current output represented by point 44.

The point of intersection 44 is made to occur on a somewhat vertical portion of response curve 41. Thus, if temperature causes inductance curve 43 to shift to the right or to the left in Figure 3, intersection point 44 will shift upwardly or downwardly along the nearly vertical portion of curve 41; and the inductance provided at point 44 will remain substantially the same. As point 44 shifts upwardly or downwardly, the control current may vary by large amounts. However, the tuned frequency of circuit 12 remains substantially constant, because its inductance remains substantially constant.

Accordingly, the detected current varies in a manner that stabilizes the inductance in tuned circuit 12 with respect to a given-input frequency, when external forces such as temperature change attempt to vary the inductance.

The stabilized-detected current can be used to precisely control the tuning of the controlled circuits in filter 11. Thus, when filter control windings 33 are receiving control current from detector 24, each capacitor 36 is adjusted to resonate each circuit 30 at the filter input frequency, which is presumed to be the frequency of source 20, or any frequency that tracks with the frequency of source 20. Capacitors 36 thereafter remain fixed. Consequently, capacitors 36 are initially adjusted to a somewhat larger capacitance than capacitor 19 to align filter circuits 30 with the incoming frequency.

Variations in the tuning of circuits 30 with temperature are corrected by the variations of the control current provided from control circuit 10, because the inductance and capacitance components in circuits 30 vary with temperature in the same manner as those components in circuit 12. As a result, filter 11 is stabilized with regard to temperature variation.

When the frequency provided by source 20 is changed, control current I will automatically adjust itself to substantially tune and stabilize filter resonant circuits 30 to the new frequency $f_2$. In control circuit 10, the new frequency $f_2$ will provide a new response curve which is illustrated by dashed curve 42. The new fixed frequency is lower than the previous given frequency $f_1$ and requires a resonant inductance $L_2$, which is larger than the previous resonant inductance $L_1$.

At frequency $f_2$, control-current curve 43 intersects response curve 42 at a new point 46 to provide a lower value of required control current. Again, the stabilized inductance differs from the resonant inductance. In this case, the difference is $L_{k_2}$, which is slightly larger than $L_{k_1}$, because of the necessary deviation from the vertical by the most vertical portion of the response curve.

However, the increase in difference inductance $L_{k_2}$ as the frequency is lowered is a desirable situation, because it is required to maintain the resonant frequency of filter circuits 30 aligned with the incoming frequency from source 20. For optimum alignment between incoming frequency 20 and the resonant frequency of controlled circuits 30, the following relationship is required:

$$\frac{L_1}{L_2}=\frac{L_{k_1}}{L_{k_2}}$$

Hence, the change in frequency causes a change in output control current that retunes filter circuits 30 to the new frequency $f_2$ with a tracking relationship between circuits 30 and 12.

Figure 2:
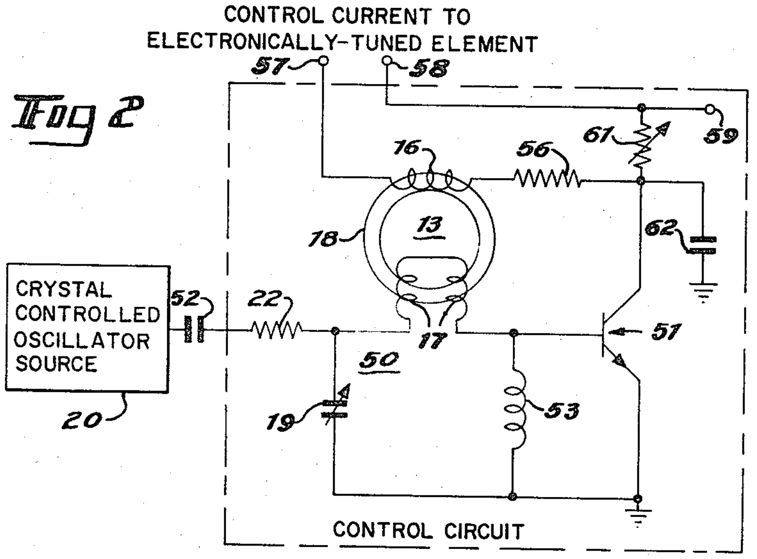
Figure 2 illustrates a modified form of the invention.

Figure 2 shows another form of the invention which operates in substantially the same way as Figure 1 but uses a low-input impedance amplifier. In Figure 2, the control circuit includes an electronically-variable inductance 17 which is wound on a core 18 with a control winding 16 in the same manner as the variable inductors in Figure 1.

A single transistor is provided in Figure 2 as both the amplifier and detector means of the control circuit.

A series-resonant circuit 50 is used in Figure 2 rather than the parallel-resonant circuit used in Figure 1. That is, capacitor 19 and inductor 17 are a series-resonant type of circuit in Figure 2. Accordingly, the resonant circuit in Figure 2 has a low impedance which can substantially match the input impedance of a transistor amplifier 51.

Components in Figure 2, which are similar to components in Figure 1, are given like reference numbers.

Capacitor 52 is a blocking capacitor which prevents any D.C. components from frequency source 20 from biasing transistor 51.

A choke coil 53 is connected between ground and the base of transistor 51 to maintain the transistor with zero bias in order to make it detect as it amplifies. In effect, it operates Class B.

Since the ground-emitter transistor amplifier is operated Class B but is not in a push-pull arrangement, it acts as a detector which provides amplification; and it is, in effect, a D.C. amplifier.

The large inductance of choke coil 53 is shunted by the low input impedance of transistor 51. Accordingly, choke 53 has very little effect upon the series-resonant frequency of tuned circuit 50 because of their parallel relationship.

A resistor 56 is connected in series with the collector of transistor 51 and control winding 16.

A controlled circuit is not shown in Figure 2, but its control windings are connected in series between terminals 57 and 58.

Another terminal 59 is connected to a stable D.C. supply source for the transistor. Terminal 58 is connected to supply terminal 59.

A rheostat 61, having a large-resistance value, is connected between the collector of transistor 51 and terminal 59. Rheostat 61 provides an initial adjustment for the control-current output between terminals 57–58.

A capacitor 62 is merely an alternating-current bypassing capacitor which filters the A.C. components provided at the output of the transistor amplifier.

A set of curves may be obtained for the system of Figure 2 which are similar to the curves in Figure 3; and the explanation of operation of the system in Figure 2 is basically the same as that given for Figure 1.

Accordingly, the invention is capable of providing automatic electronic tuning and automatic temperature stabilization for electronically-tunable circuits having trackable inductance.

Although this invention has been described with respect to particular embodiments thereof, it is not to be so limited as changes and modifications may be made therein which are within the full intended scope of the invention as defined by the appended claims.

I claim:

1. Electronic means for tracking the bandpass of a resonant-type filter with a given frequency, comprising a control circuit that includes a resonant circuit receiving said given frequency, said resonant circuit not being part of said filter, a plurality of saturable reactors respectively providing inductive portions of said resonant-type filter and said resonant circuit, a plurality of direct-current control windings being respective parts of said saturable reactors, an amplifier of said control circuit having its input connected to said resonant circuit, and a detector connected to the output of said amplifier, with the output of said detector connected serially to the control windings of each of said saturable reactors, with the frequency response of said resonant circuit being offset from the bandpass response of said resonant-type filter.

2. An electronically-tunable filter wherein said filter comprises at least one resonant circuit, comprising an automatic control circuit for tuning said filter to a given frequency, comprising a plurality of saturable reactors, each having control windings and controlled windings, a parallel-resonant circuit in said control circuit including at least one of said saturable reactors, said parallel-resonant circuit receiving the given frequency, amplifier and detector means being connected to the output of said parallel-resonant circuit to provide a direct-current output proportional to the tuning deviation of said parallel-resonant circuit, said control windings respectively receiving the direct-current output of said amplifier and detector means, with the bandpass of said parallel-resonant circuit being different from the bandpass of said tunable filter, wherein the tuning of said filter tracks with said given frequency.

3. An electronic filter being automatically tuned to an input frequency injected into a control circuit, comprising a tunable resonant circuit in said control circuit, an electronically-controlled tuning element included within said tunable circuit, the side of the bandpass of said resonant circuit aligned with said input frequency, direct-current control means associated with said resonant circuit for controlling the reactance of said electronically-controlled tuning element, amplifier and detector means having its input connected to said tunable circuit, said direct-current control means being connected to the output of said amplifier and detector means, and said electronic filter comprising a plurality of electronically-controlled tunable resonant circuits of the same type as said first-mentioned tunable resonant circuit, each of said plurality having direct-current control means connected in series with the output of said amplifier and detector means, with the bandpass of said filter tracking with but not necessarily receiving said frequency injected into said control circuit.

4. Control means for tuning an electronically-tunable filter by means of an input frequency injected into said control means, comprising a parallel-resonant circuit including an electronically-variable inductance, with a control winding provided with said inductance to enable direct-current control of its reactance, detector and amplifier means having its input connected to said tunable circuit, said control winding connected in series with the direct-current output of said detector and amplifier means, said direct-current output being the output of said control circuit, a resistor connected in series between said tunable circuit and said injected input frequency, a plurality of additional resonant circuits of the same type as said first-mentioned resonant circuit, an electronically-tunable filter comprising said additional resonant circuits being connected in tandem, with a control-winding being provided for each of said additional resonant circuits, and said control windings of said filter receiving the direct-current output of said control circuit.

References Cited in the file of this patent

UNITED STATES PATENTS

| | | |
|---|---|---|
| 2,051,364 | Braden | Aug. 18, 1936 |
| 2,413,263 | Suter | Dec. 24, 1946 |